Dec. 13, 1949 E. D. RANEY 2,490,919
CONTROL APPARATUS
Filed Sept. 6, 1945 2 Sheets-Sheet 1
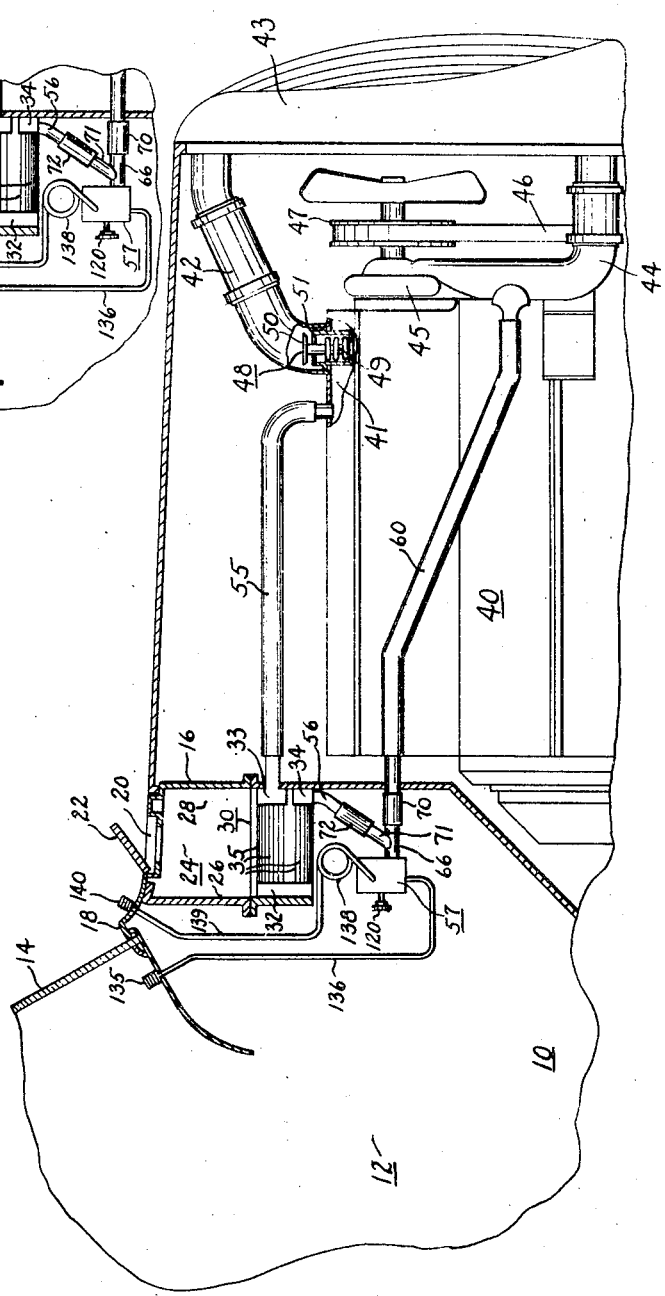
INVENTOR
ELDON D. RANEY
BY
ATTORNEY Dec. 13, 1949  E. D. RANEY  2,490,919
CONTROL APPARATUS
Filed Sept. 6, 1945  2 Sheets-Sheet 2
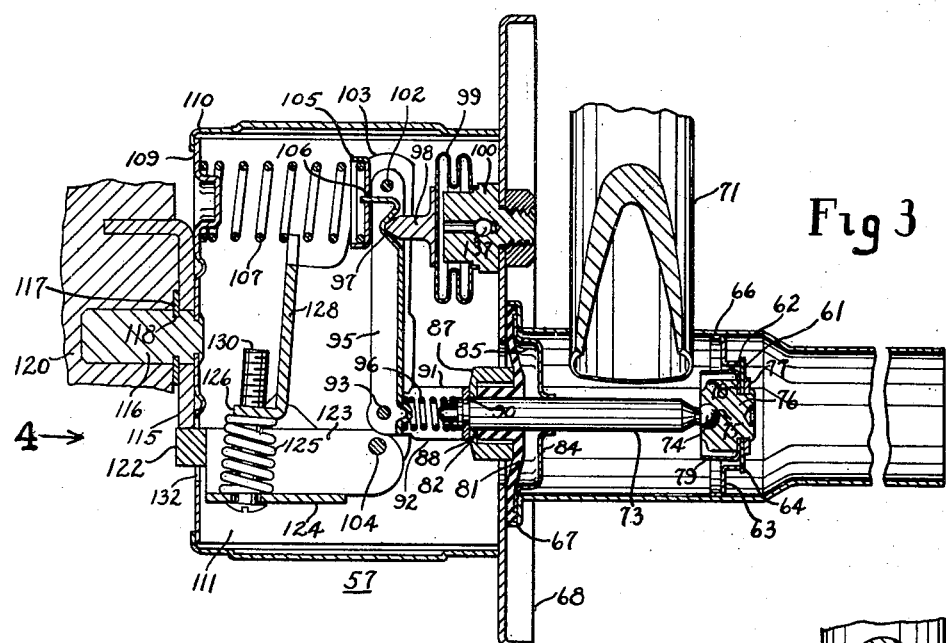
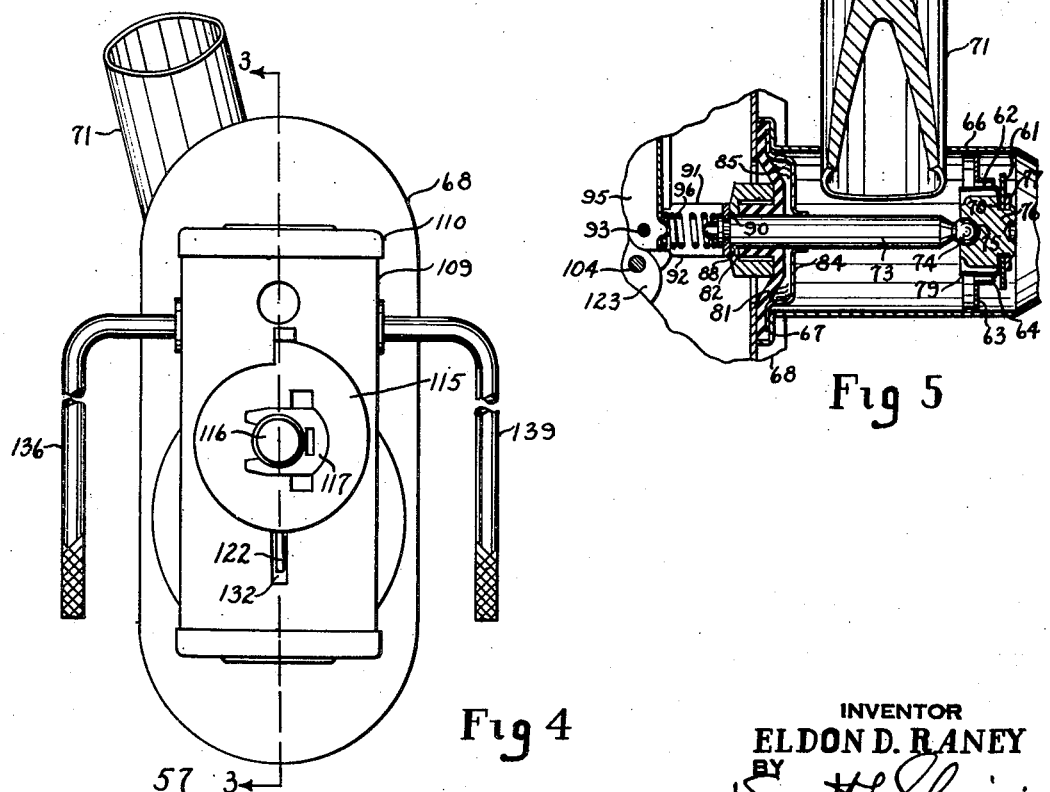
INVENTOR
ELDON D. RANEY
BY
ATTORNEY Patented Dec. 13, 1949

2,490,919

UNITED STATES PATENT OFFICE 2,490,919

CONTROL APPARATUS

Eldon D. Raney, Columbus, Ohio, assignor to Ranco Incorporated, Columbus, Ohio, a corporation of Ohio Application September 6, 1945, Serial No. 614,754

3 Claims. (Cl. 237—8)

The present invention relates to heating systems and the thermostatic control therefor, and more particularly to heating systems for the passenger compartments of automobiles.

One of the objects of the present invention is to attain and then maintain a constant temperature in an enclosure, as for example, the occupant or passenger compartment of an automobile.

In addition to maintaining the desirable temperature within the enclosure, it is also desirable to constantly admit fresh air to the enclosure. Due to variations in the outside temperature and the variations and conditions, as for example, the opening and closing of windows or doors of the enclosure or the discharge or admittance of occupants to the enclosure, it is necessary to vary the heating effect of the heater which heats the air flowing to the enclosure.

In addition to the foregoing factors, other variable factors are encountered when the enclosure is part of a moving vehicle such as an automobile. Obviously, if fresh air is to be admitted to the compartment of the automobile, the direction of travel or the speed of the automobile or both, will affect the quantity of air entering from the outside to the compartment. For example, if the air inlet opening leading to the compartment faces the front of the car, more air will be forced into the compartment when the automobile is traveling counter to the direction of travel of the outside air than when it is traveling with the direction of travel of the air. Also, more air will be forced into the compartment at a higher rate of travel than at a lower rate. In a relatively small enclosure like the compartment of an automobile, the air inlet to the compartment must of necessity be relatively close to the occupant. Any major change in the temperature of the air entering the compartment, either an increase in temperature or a decrease in temperature, causes discomfort to the passengers. If, for example, a quantity of air entering the compartment is suddenly increased, as for example, by a change in direction of travel of the vehicle to a direction counter to the environment air currents, the air emanating from the heater and passing into the compartment will be too cool upon the legs of the occupant and will be discomfortable if the condition is prolonged, or, if the quantity of air entering the compartment is suddenly decreased due, for example, by a change of direction of the vehicle so that it moves with the environment air currents, the lesser quantity of air, heated by the heater and emanating therefrom, will be too warm and will cause discomfort if continued for a prolonged period.

It is a further object of the present invention to provide a control which is highly sensitive to the variable factors encountered, particularly those encountered by a moving vehicle, and in carrying out this object, it is a further object of the present invention to provide a thermostatic system of control for varying the heating effects of the heater, not only responsive to the temperature within the car, but also responsive to the temperature of the air outside of the compartment and to the immediate temperature effects of the heater. To accomplish this, the rate of heat exchange between the heater and air is varied, as for example, by regulating the quantity of heating fluid passing through the heater. A throttling valve is used for this purpose and the throttling effect of the valve is controlled automatically by a thermostatic system of the closed type which is completely filled with liquid having the character of expanding and contracting with increase and decrease of temperature. More specifically, it is an object of this invention to extend portions of this thermostatic system to various points of temperature change as by extending a portion of this thermostatic system to the exterior of the compartment where it is subjected to the surrounding environment temperature, a portion directly affected by the heating effects of the heater and a third portion remote from the heater but within the compartment, and, to proportion the volumes of these various portions so that the thermostatic system in its entirety, is highly sensitive to all of the variable factors encountered in a moving vehicle.

Further objects and advantages will be apparent from the following description, reference being had to the accompanying drawing wherein preferred forms of embodiment of the present invention are clearly shown.

In the drawings:

Fig. 1 is a fragmentary view, partly in section, of an automobile showing a heat exchanger for heating the air in the passenger compartment of the automobile and showing a thermostatically controlled system for regulating the flow of heat exchange fluid through the exchanger;

Fig. 2 is a fragmentary view, partly in section, of a portion of the automobile shown in Fig. 1, and showing the same type of heat exchanger for heating the air in the passenger compartment, but showing a slight modified form of the thermostatic system;

Fig. 3 is a sectional view of the throttle valve and the control therefor, the section being taken on line 3—3 of Fig. 4;

Fig. 4 is a view of the control looking in the direction of arrow 4 of Fig. 3; and Fig. 5 is a fragmentary sectional view of a portion of the controller and the throttle valve showing the valve partly open.

Although the present invention is capable of use in many different forms of heat exchange systems, it is illustrated as applied to an automobile wherein the heat exchange liquid is circulated in heat exchange relation with air flowing into the passenger compartment of the automobile. A part of the automobile is designated at 10 and is provided with a closable passenger compartment 12, the forward part of which compartment is shown in the drawings. The compartment 12 is closed in the front by a windshield 14, a front wall 16 and a cowl 18. The cowl is provided with an opening 20, which opening may be closed by cover 22. The cover is suitably hinged adjacent the rear edge of the opening 20 so that the cover may be tilted upwardly to deflect air into the opening when the automobile is in forward motion. Mechanism for tilting the cover as described is well known and, therefore, is not shown.

A duct 24 is formed by downwardly extending walls 26 and 28 and the front wall 16. Two walls 28 confront one another and only one appears in the drawings. The walls 26 and 28 are attached, at the top edges thereof, to the cowl so that the duct directs the air, entering the opening 20, downwardly. A heat exchange or heater 30 is attached to the lower end of the duct 24. The heater may be any suitable type, and in the present disclosure, it comprises a header 32 connected with an upper header 33 and a lower header 34 by copper tubes 35. The tubes 35 are spaced apart laterally with respect to one another so that the air passing out of the lower end of the duct 24 will strike the tubes. The tubes 35 are heated by heat exchange fluid which enters the header 33, transverses the upper tubes 35 to the header 32 and then flows to the header 34 through the lower tubes 35. Thus, the air passing over the heater 30 is heated thereby.

The heat exchange fluid, in the present embodiment, is hot liquid that is supplied to the heater 30 from the cooling system of the automobile engine 40. The engine 40 is a water cooled, internal combustion engine. Water or other suitable cooling fluid is circulated through a water jacket 41, surrounding the cylinders of the engine, through a duct 42 to a radiator 43, through duct 44 to a centrifugal pump 45, whence the liquid is discharged into the water jacket. The pump 45 is driven by belt 46 and a pulley 47, which belt and pulley are driven by the engine. Thus, the pressure of the circulating fluid is proportioned to the speed of the engine since the speed of the pump effects the pressure of the liquid.

A thermostatic valve 48 is positioned at the discharge of the water jacket to prevent circulation of the liquid to the radiator 43 until the temperature of the liquid in the jacket is raised to a predetermined temperature, for example 160° F. Such valves are well known and they may comprise a fluid filled bellows 49 connected with a valve 50 adapted to close a valve port 51. When the temperature of the liquid rises to 160° F., the fluid in the bellows 49 expands the bellows to cause the valve to open and when the liquid falls below 160° F., the fluid in the bellows contracts and the bellows collapses to close the valve. Thus, after the engine is heated, the temperature of the liquid in the water jacket will be maintained at approximately 160° F.

Hot liquid is supplied to the header 33 through a duct 55. The liquid discharges from the exchanger through a duct 56 to a thermostatically controlled valve 57 and from the valve the liquid is returned to the conduit 44 through a conduit 60.

Referring now specifically to Figs. 3, 4 and 5, the thermostatically controlled valve 57 includes a disc type valve 61 which is arranged to control the flow of fluid through a port 62 in the center of a wall 63. This wall forms a valve seat 64 for the valve 61. Wall 63 is disposed transversely within a tube 66; the end of this tube is flared as at 67 and is secured to a mounting plate 68. Plate 68 is suitably secured, as for example, to the dash of the automobile. Tube 66 is connected by a rubber hose connector 70 with the conduit 60. Tube 66 is connected by a tube 71 and a coupling 72 with the conduit 56.

Valve 61 is connected with a valve stem 73 through a ball and socket connection; a ball 74 is formed on the end of the stem 73 and rides within the socket 75 of socket member 76. Valve 61 is clamped between washers 77 and 78. The washer 78 includes a plurality of inwardly extending prongs 79 which guide the valve within the port 62. The end of the tube 66 is closed by a rubber diaphragm 81 having a hub section 82 which surrounds the ends of the stem 73. A metallic disc 84, having a central opening for receiving the stem 73, is interposed between the diaphragm 81 and the flange 67 on the tube 66. The disc 84 and the diaphragm 81 are clamped in position by the flange 67 when the flange 67 is secured to the base 68. The central portion of the disc 84 provides a guide for the valve stem 73 and the rounded portion 85 upon the disc 84 provides a curve section about which the diaphragm is flexed. A collar 87 surrounds the hub section 82 of the diaphragm 81 and is provided with an inwardly extending flange 88 which covers the end of the hub.

The end of the valve stem 73 is suitably connected to the yoke portion 90 of a U-shaped member 91. The legs 92 of the U-shaped member 91 are pivotally connected by a pin 93 to a lever 95. A spring 96 is interposed between the lever 95 and the end of the stem 73, and yieldingly urges the stem away from the lever 95 to hold the lever 95 against the pivot 93. Lever 95 includes a socket 97 for receiving the tapered pin 98. Pin 98 is connected to the movable end of a metallic bellows 99. The opposite end of the bellows 99 is connected by a coupling 100 to the mounting plate 68. Lever 95 is pivoted by pin 102 to a lever 103. Lever 103 is U-shaped and the end, opposite the pivot 102, is pivoted on a stationary pin 104. A spring seat 105 rests upon knife-edge bearings 106. These bearings 106 project forward from lever 95 and are interposed between the socket 97 and pivot pin 102. A spring 107 is interposed between the spring seat 105 and the front wall 109 of a casing 110. The side walls 111 of casing 110 carry the pin 104 for the lever 103. The spring 107 yieldingly urges the socket 97 of the lever 95 against the pin 98. When the bellows 99 contracts, spring 107 will cause the lever 95 to be moved in a counterclockwise direction causing the valve stem 73 to be moved to the right to lift the valve 61 from its seat 64 or if the valve is partly open, to further increase the valve opening. The quantity of fluid flowing through the valve is dependent upon the degree of contraction of bellows 99. Upon decrease in volume within the bellows 99, increased flow of fluid through the valve occurs. Conversely, as the bellows expands, the flow through the valve is decreased.

The volume range in the bellows 99 at which valve throttling action is to take place, can be shifted by shifting the position of pivot 102 for lever 95. This is accomplished by shifting lever 103 about its pivot 104. For this purpose, there is provided a cam controlled mechanism. The mechanism includes a cam 115 carried by a pin 116 which latter is secured to and extends outwardly of the front wall 109 of the casing 110. A clip 117 projecting in grooves 118 in the pin 116 to hold the cam in position on the pin 116. Cam 115 may be turned by a knob 120. Cam 115 is adapted to move a cam follower 122 and this cam follower 122 is the forward part of a lever 123 which is also pivotally mounted upon the pin 104. Lever 123 is U-shaped having a yoke portion 124. A coil spring 125 is interposed between the yoke portion 124 and an ear 126 which extends outwardly from the yoke 128 of lever 103. A screw 130 extends through the yoke 124 of lever 123 and is threaded into the ear 126 of lever 103. Spring 125 is of such character and under such tension as to maintain the screw 130 in the position to which it is adjusted. Cam follower 122 extends through a slot 132 in the front wall 109 in the case 110 and is adapted to be moved downwardly by the action of the cam when the cam is turned in a clockwise direction.

Spring 107 is used primarily as an operating spring counteracting the bellows 99. It also maintains the cam follower 122 upon the cam 115. When it is desirable to prevent the closing of the valve until a relatively large volume is attained in the bellows 99, pivot pin 102 is moved to the left to cause the lower end of lever 95 to be moved to the right, causing the bellows stem to open the valve farther. Therefore, more volume must be attained in the bellows 99 before the valve is closed upon its seat. Conversely, if it is desirable to have the valve closed at a smaller volume within the bellows 99, the pivot pin 102 is moved to the right, whereby the lower end of the lever 95 will be moved to the left. As previously explained, pivot pin 102 is moved by the cam 115 which actuates the cam follower 122, which, in turn, shifts lever 103 through the screw 130.

The screw 130 may be said to constitute a factory adjusting mechanism. In setting the mechanism, cam 115 is moved to the position shown in Fig. 4 and then a fixed volume is maintained in bellows 99. At this predetermined volume, the valve 61 should be a predetermined distance from its seat 64. The correct setting is attained by turning screw 130 either one way or the other to vary the relative positions of yoke 124 and lever 103.

The bellows 99 forms part of a closed thermostatic system. The thermostatic system includes a liquid containing portion 135, a tube 136 connected with portion 135 and with a passage 137 in coupling 100 of the bellows, a liquid containing portion 138 which is also connected with the passage 137, a tube 139 connected with portion 138 and with a liquid containing portion 140. This system is filled or substantially filled with an expansible liquid. These portions 135, 138 and 140 may be formed as coils of tubing.

Coil 135 is placed in the interior of the compartment at a point where little or no draft occurs and where it is responsive to the mean or average temperature of the compartment and responsive to radiant heat, as for example, above the dash and near the windshield. Coil 138 is disposed so that it is directly subjected to the heating effect of the heat exchanger and coil 140 is disposed so as to be directly affected by the temperature of the air outside of said inclosure. In Fig. 1, the coil 140 is shown mounted on the exterior cowl of the automobile while in Fig. 2, coil 140 is disposed underneath the hood but in the direct path of the incoming air.

The thermostatic system controls the heating of the passenger compartment, and, after the compartment attains the desired temperature, as determined by the adjustment through the knob 120, the thermostatic system maintains the temperature in the compartment constant. In order to maintain the temperature constant within the passenger compartment, it is necessary to increase the temperature of the heated air flowing to the compartment if the outside temperature or environment temperature decreases. Obviously, if the environment temperature decreases, there will be an increased differential between the temperature desired in the compartment and the environment temperature. Therefore, the air must be heated to a higher temperature. As soon as the environment temperature starts to fall, the temperature of the coil 140 will decrease, causing a decrease of volume in the thermostatic system. The bellows will collapse slightly and cause the valve 61 to open farther to permit the increased flow of heated water through the heater. In this manner, the thermostatic system is not only highly responsive to the small changes in temperature that take place in the compartment, through coil 135, but it also responsive to the changes in the environment to actuate the throttle valve so as to prevent the small changes in temperature taking place in the compartment.

As previously explained, some heating systems must function to compensate for many variable factors encountered and this is particularly true of heating systems for automobiles in which the speed of the automobile and the direction of travel tend to vary the heating effect of the heater and tend to cause variations in the quantity of air passing over the heater. It will be understood that the change in speed of the automobile engine causes a change in the quantity of water flowing through the heater. Also, a change in speed of the automobile causes a change in the amount of air flowing through the heater. A change in either of these conditions or both tends to effect the rate of heat exchange between the heater and the air.

Coil 138 is provided for preventing these variables from affecting the temperature of the air in the compartment. It is disposed so that it is directly subjected to the heating effect of the heater and it is herein shown as being disposed in the air emanating from the heater. If for example, the direction of the automobile is changed so that it travels counter to the air, more air will be forced through the heater. If the temperature of the heater is not increased to compensate for the increased flow thereover, the air will enter the compartment at too low temperature, and since this air is of necessity discharged close to, for example, the legs of the occupant, this flow of air will cause discomfort to the occupant, if prolonged. By disposing the coil 138 so that it is directly subjected to the heating effect of the heat exchanger, as soon as the air decreases in temperature, the volume will be decreased causing the valve 61 to increase the flow of water through the heater, and thus cause a higher rate of heat exchange between the heater and the incoming air. Conversely, if the amount of air flowing over the heater is decreased, it is desirable to decrease the flow of water flowing through the heater, i. e., if the air flow is decreased, the air emanating from the heater and passing, for example, over the legs of the occupant would be too warm for comfort if continued for a prolonged time. Since the coil 138 is disposed directly below the heater and subjected to this warm air, when the air temperature is too warm, the coil 138 will respond thereto causing an increase in volume in the thermostatic system and a consequent further throttling of the valve so as to decrease the flow of water through the heater.

It will be understood from the foregoing that the other variables encountered, which tend to affect the rate of heat exchange between the heater and the air, are compensated for in the same manner as in the example given in the preceding paragraph.

Coil 138 also functions to throttle the flow of water through the heater in the event that the heating is too rapid during the period while the temperature of the compartment is being raised to the normally desired temperature. This is particularly true during the period while the compartment temperature is approaching that which is normally desired. It has been determined from experience that the occupants of the passenger compartment will be annoyed if the air entering the compartment is too warm although the compartment has not attained the normally desired temperature, particularly at the time just preceding the attainment of the desired normal temperature. It has been ascertained that the requisites for comfort are to first admit relatively warm air to the compartment while the compartment is cold and then to gradually decrease the temperature of the air entering the compartment as the compartment temperature approaches that normally desired. All of this is accomplished by the combined operating effect of all three portions 135, 138 and 140 and it has been discovered that in order to achieve the desirable results, it is necessary that the capacity of the coil 135 materially exceed the capacity of either coils 138 and 140. It will be understood that these relative volumetric capacities of coils 135, 138 and 140 must of necessity be varied in accordance with the size of the compartment being heated and other variable factors such as the construction of the heater and the size of the air passage or the disposition of the coil 135. The volumetric capacities of each of the portions 138, 140 and 135 may vary somewhat, as for example, the capacity of portion 138 may be one-half or twice that of portion 140, depending on the size of the heater, however, the capacity of portion 135, for most accurate results, should be as large as practical, the limiting factor of capacity of portion 135 being the tensile strength of the metal bellows. If the capacity is too great, bursting pressure would be imposed on the bellows during the summer season. In a five passenger compartment, excellent results were obtained when the relative volumetric capacities of coil 138, 140 and 135 were in the order of one, one, four, wherein the volumetric capacity of coil 135 was approximately four times that of either of coils 138 or 140. All coils and the connecting tubing 136 and 139 were formed of $\frac{3}{32}$ inch O. D. tubing having an inside diameter of .0525. Coil 135 was approximately eight feet in length and coils 138 and 140 were each approximately two feet in length.

From the foregoing, it will be seen that I have provided a heating system and a thermostatic control therefor which controls the heating of an automobile compartment and maintains the compartment at a selectable desired temperature while providing for the constant ingress of fresh air to the compartment, the thermostatic system being highly sensitive to correct the heat exchange between the air and the heater to compensate for the many variable factors encountered such as the change in the environment temperature, the speed of the automobile, the speed of the engine, and the direction of travel with respect to the environment air currents. All of this is accomplished by providing a thermostatic system having portions exposed to the environment temperature, the direct heating effect of the heater and the temperature within the compartment, the portions of the thermostatic system exposed to these temperatures having such relative volumetric capacities so that their relative influence upon the system as a whole do not under-compensate or over-compensate the other portions in their relative functions of control of the system in response to the distinct temperatures to which they are subjected.

The bellows 99 is disposed adjacent the hot water pipe 71 and disposed within the casing 110. After the bellows is once heated, ordinary changes in temperature within the pipe 71 will not affect the temperature of the bellows because of the large mass of metal in heat exchange relation with the bellows. In this manner the temperature of the bellows remains substantially constant and does not affect the pressure within the thermostatic system.

When the automobile is moving forward, even at a relatively low rate of speed, sufficient air is forced through the heater to maintain a slight pressure within the compartment, providing the windows and doors of the compartment are closed, and the air leaks from the compartment through the cracks about the doors and windows. Obviously, air can be forced into the compartment in manners other than that disclosed herein. For example, the air can be forced into the compartment by a blower as shown and described in the patent to E. C. Raney No. 2,333,818 patented November 9, 1943.

While the forms of embodiment of the present invention as herein disclosed constitute preferred forms, it is to be understood that other forms might be adopted, all coming within the scope of the claims which follow.

I claim:

1. In an automobile heating system for the passenger enclosure, means forming an enclosure for passengers; a heat interchanger associated with the enclosure; means for directing fresh outside air over the heat interchanger into the enclosure and for substantially preventing air within the enclosure from recirculating over the heat exchanger; control means operable for attaining a desired temperature of air within the enclosure and operable, after said desirable temperature is attained, for preventing the temperature of the air emanating from the heat interchanger from varying beyond a certain temperature, said last means including a controller for changing the rate of heat exchange between the heat interchanger and the air; a closed thermostatic system including a device forming an expansible and contractible chamber, a portion disposed to be directly affected by the temperature of the air outside of said enclosure, a portion disposed to be subjected directly to the heating effects of the heat interchanger, a portion disposed in the enclosure remote from the heat interchanger, and duct means connecting said chamber and said portions, each of said portions of said thermostatic system containing a liquid under all conditions of operation adapted to expand and contract in response to increase and decrease, respectively, of the temperature thereof, the liquid content of said last mentioned portion being greater than the liquid content of either of said other portions; and means for transmitting the movement of the expansible and contractible device for regulating the controller.

2. In an automobile heating system for the passenger enclosure, means forming an enclosure for passengers; a heat interchanger associated with the enclosure; means for directing fresh outside air over the heat interchanger into the enclosure and for substantially preventing air within the enclosure from recirculating over the heat exchanger; control means operable for attaining a desired temperature of air within the enclosure and operable, after said desired temperature is attained, for preventing the temperature of the air emanating from the heat interchanger from varying beyond a certain temperature, said last means including a controller for changing the rate of heat exchange between the heat interchanger and the air; a closed thermostatic system including a device forming an expansible and contractible chamber, a portion disposed to be directly affected by the temperature of the air outside of said enclosure, a portion disposed to be subjected directly to the heating effects of the heat interchanger, a portion disposed in the enclosure remote from the heat interchanger, and duct means connecting said chamber and said portions, each of said portions of said thermostatic system containing a liquid under all conditions of operation adapted to expand and contract in response to increase and decrease, respectively, of the temperature thereof, the relative liquid content of the first and second mentioned portions being between one and two parts for the first mentioned portion, between one and two parts for the second mentioned portion and the liquid content of the third mentioned portion being approximately twice that of the sum of the contents of the first and second portions; and means for transmitting the movement of the expansible and contractible device for regulating the controller.

3. In an automobile heating system for the passenger enclosure, means forming an enclosure for passengers; a heat interchanger associated with the enclosure; means for directing fresh outside air over the heat interchanger into the enclosure and for substantially preventing air within the enclosure from recirculating over the heat exchanger; control means operable for attaining a desired temperature of air within the enclosure and operable, after said desirable temperature is attained, for preventing the temperature of the air emanating from the heat interchanger from varying beyond a certain temperature, said last means including a controller for changing the rate of heat exchange between the heat interchanger and the air; a closed thermostatic system including a device forming an expansible and contractible chamber, a portion disposed to be directly affected by the temperature of the air outside of said enclosure, a portion disposed to be subjected directly to the heating effects of the heat interchanger, a portion disposed in the enclosure remote from the heat interchanger, and duct means connecting said chamber and said portions, each of said portions of said thermostatic system containing a liquid under all conditions of operation adapted to expand and contract in response to increase and decrease, respectively, of the temperature thereof; and means for transmitting the movement of the expansible and contractible device for regulating the controller.

ELDON D. RANEY.

REFERENCES CITED

The following references are of record in the file of this patent:

UNITED STATES PATENTS

| Number | Name | Date |
|---|---|---|
| 1,971,532 | McAuley | Aug. 28, 1934 |
| 2,262,496 | Hobbs et al. | Nov. 11, 1941 |
| 2,290,153 | Barnes | July 21, 1942 |